United States Patent
Haber

(10) Patent No.: US 6,715,447 B2
(45) Date of Patent: Apr. 6, 2004

(54) MOUNTABLE CLAMP-ON CAT SCRATCHING DEVICE

(76) Inventor: Jason Bernard Haber, 1821 Cleveland Ave., Santa Barbara, CA (US) 93103

( * ) Notice: Subject to any disclaimer, the term of this patent is extended or adjusted under 35 U.S.C. 154(b) by 0 days.

(21) Appl. No.: 10/185,262

(22) Filed: Jun. 26, 2002

(65) Prior Publication Data

US 2003/0000483 A1 Jan. 2, 2003

Related U.S. Application Data

(60) Provisional application No. 60/301,674, filed on Jun. 27, 2001.

(51) Int. Cl.⁷ .............................................. A01K 15/02
(52) U.S. Cl. ....................................... 119/702; 119/706
(58) Field of Search ................................ 119/702, 706; D30/158, 160, 119

(56) References Cited

U.S. PATENT DOCUMENTS

| | | | | |
|---|---|---|---|---|
| 2,888,906 A | * | 6/1959 | Delp | 119/706 |
| 3,085,551 A | * | 4/1963 | Helmer | 119/706 |
| D322,494 S | * | 12/1991 | Reynolds | D30/158 |
| 5,113,795 A | * | 5/1992 | Delzio | 119/706 |
| 5,247,902 A | * | 9/1993 | Williams | 119/706 |
| 5,619,953 A | * | 4/1997 | Griffin | 119/706 |
| 6,205,955 B1 | * | 3/2001 | Diep | 119/706 |
| 6,343,569 B1 | * | 2/2002 | Buendiger | 119/706 |
| 6,360,692 B2 | * | 3/2002 | Gear | 119/706 |
| 6,619,237 B2 | * | 9/2003 | Robertson | 119/706 |

* cited by examiner

Primary Examiner—Charles T. Jordan
Assistant Examiner—Judith A. Nelson
(74) Attorney, Agent, or Firm—Charles R. Sutton

(57) ABSTRACT

A cat scratching post that incorporates a clamping mechanism for secure and stable attachment to a receiving object like a doorjamb. A resilient main superstructure has an adhesive interface securing a surface material that is appropriate for cats to scratch or climb. A user of the scratching post can pry open the superstructure and clamp it onto a receiving object. The device is an improvement over other scratching posts because of its space saving implications, as virtually no floor area is required. No base is required to stabilize the device; stability is derived from the receiving object combined with the clamping force the scratching post provides. A detachable base element may be incorporated for freestanding use. Perch elements and hanging toys can be attached providing climbing, perching, and playing opportunities. (Two units of the invention can be clamped end to end to make a climbing area twice as long.)

14 Claims, 5 Drawing Sheets

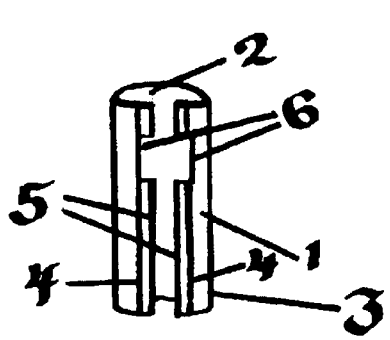
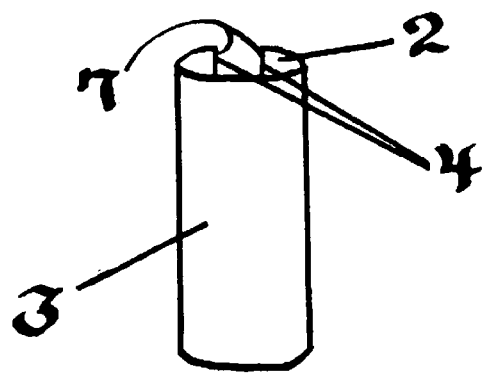
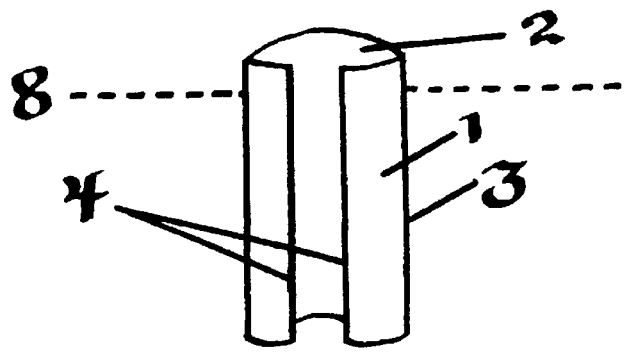
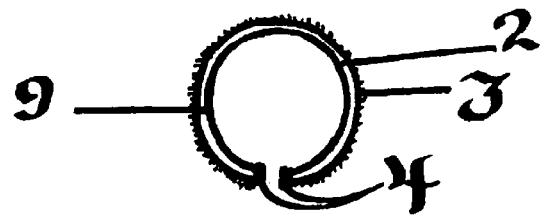

MOUNTABLE CLAMP-ON CAT SCRATCHING DEVICE

CROSS-REFERENCES TO RELATED APPLICATIONS

This application incorporates provisional patent application No. 60/301,674 by this reference. Provisional patent application No. 60/301,674 has an application filing date of Jun. 27, 2001. Applicant claims the benefit of the filing date of that provisional application by reason of this incorporation by reference.

STATEMENT AS TO RIGHTS TO INVENTIONS MADE UNDER FEDERALLY-SPONSORED RESEARCH AND DEVELOPMENT

This invention was not made under Federally-sponsored Research and Development. The inventor retains all rights.

BACKGROUND OF THE INVENTION

1. Field of the Invention

This invention relates to cat scratching devices, specifically to cat scratching devices having a clamping mechanism that allows users to attach or mount the device onto a receiving object.

Domestic cats need to stretch, jump, climb and scratch in order to promote healthy body alignment, get sufficient exercise, and properly maintain their claws. In the outdoors, trees and other objects provide opportunities for these activities; however, indoor cats tend to use household furniture, carpeting, or various types of specialty cat furniture and scratching devices to fulfill these needs.

2. Description of Related Art Including Information Disclosed Under 37 CFR Sections 1.97 and 1.98

Typical scratching devices are comprised of freestanding structures (usually a carpeted post attached to a flat square base) that tend to be bulky, awkward and unstable, while taking up valuable floor space. Another popular design is simply a cardboard box filled with corrugated cardboard strips, which must be discarded and replaced regularly. Most of these devices do not provide adequate opportunities for climbing and jumping, and do not effectively offer a means to provide exercise for indoor cats. Thus, manufacturers of cat scratching devices have long sought to develop innovative designs for effectively providing stable cat scratching and climbing devices in space saving designs.

Some partial solutions to developing a space saving design have been to hang a carpet or sisal covered board from a door handle, or over the door itself. These designs are unstable and tend to knock around noisily when used. This will often discourage a cat from using the device. Neither of these designs provides opportunities for climbing and both are rather unstable.

U.S. Pat. No. 5,592,901 to Birmingham (1997) shows a scratching device designed to protect household furniture such as couches and chairs. This device incorporates a flexible "foot" element, which creates a biasing force when wedged under a piece of furniture; however, that design is restricted in its application in that it must be used in conjunction with a piece of furniture. The device does not allow for attachment to any item other than a piece of furniture and does not incorporate a clamping force to provide its means of attachment and stability. The flexible nature and clamping mechanism incorporated in the instant invention allows for it to be attached to a variety of receiving objects, either with or without being in contact with the floor.

In conclusion, this inventor is unaware of any prior cat scratching device that provides a clamping mechanism that allows for its installation on vertical or horizontal elements such as door jambs, stair banisters, or interior walls. All of the prior art has neglected to recognize the opportunity to attach a scratching post in this manner. The benefit of doing so is found in the degree of stability and space saving characteristics of the installation. The degree of stability, ease of installation, removal and storage, durability, and space saving aspects of the design are all unique to this field of invention. The design lends itself to the use and incorporation of recycled materials, such as plastic, and easily accomodates the use of replaceable scratching surfaces, which would maximize the useful life of the main structure of the invention.

SUMMARY OF THE INVENTION

The invention, an improved mountable clamp-on cat scratching device, has a flexible and adjustable clamping mechanism enabling it to be securely attached to various objects, such as a household doorjamb, exposed wall end, stair banister, or other surface. The device is comprised of a long "C" shaped or "E" shaped superstructure, made of some type of resilient, but sturdy material such as plastic, aluminum, cardboard, rubber, or stainless steel, which can be pried open and clamped onto another object such as a doorjamb. The superstructure can be covered by various means with carpeting, sisal rope, or any other material that is appropriate for a cat to scratch or climb. The clamping action can simply be provided by the resilient nature of the superstructure itself, or an adjustable mechanical clamping device can be incorporated within the main superstructure.

The clamping feature allows the device to be easily secured to a receiving object, thereby eliminating the need for a base, or other means of providing stability. Even though need for a base is eliminated by this invention, the possibility of it having an optional removable base component is shown by the conceptual trick of turning the table of FIG. 13 upside down with the invention still attached. The invention could be removed from the table leg, but while it is on, it represents a free standing columnar climbing facility for a cat.

The ability to clamp the invention to a receiving object greatly reduces the amount of floor space dedicated to the scratching post. Further, the device is easily removed and stored away when not in use. The design mimics and provides the climbing, perching, and scratching provided in nature by trees.

Accordingly, several objects and advantages of the invention are to provide an improved cat scratching device, to provide a scratching post that inconspicuously integrates into home decor, to provide a scratching post that can easily attach to, and be removed from, a wide variety of receiving objects. Still further objects and advantages will become apparent from a study of the following description and the accompanying drawings.

BRIEF DESCRIPTION OF THE DRAWINGS

FIG. 1 is a perspective view of a cat scratching post constructed in accordance with the invention, showing the back (open) side of the device.

FIG. 2 is a perspective view of the front (closed) side of the scratching post shown by FIG. 1.

FIG. 3 is a sectional view of the scratching post, showing its superstructure, adhesive element and scratching surface.

DESCRIPTION OF THE PREFERRED EMBODIMENT

Figure 4:
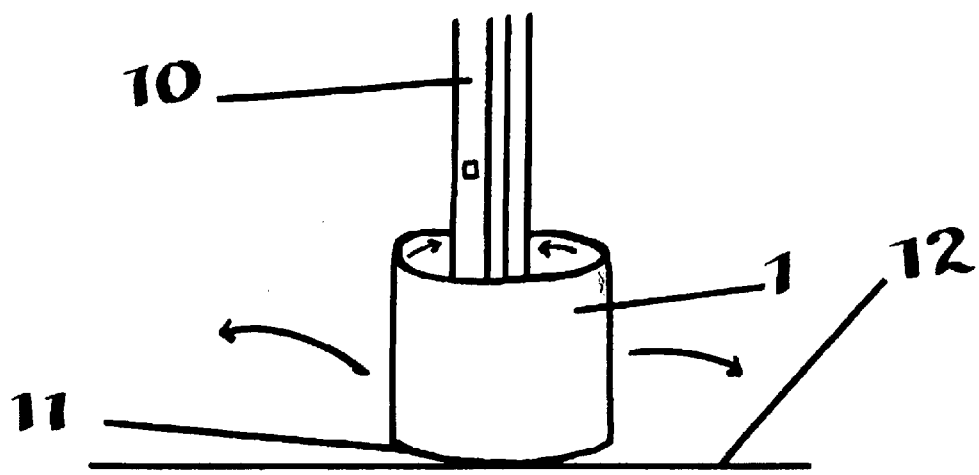
FIG. 4 is a perspective view of the front side of the scratching post, showing the post mounted, or clamped, onto a common household doorjamb.

FIG. 1 is a perspective view taken from the back, or open side of a cat scratching post (1) constructed in accordance with the invention. A main superstructure (2) of the scratching post is generally "C" shaped or "E" shaped, which can be clamped onto or around a receiving object such as a household doorjamb. The main superstructure (2) is coated with an adhesive connecting element such as glue, VELCRO (hook and loop fasteners), or various types of snaps, or buttons, allowing for a scratching surface material (3), such as carpet or sisal rope to be attached to the main superstructure (2). A non-slip material (4) such as rubber may be incorporated at the points of contact (5) between the scratching post and the receiving object. Notches (6) can be indented on the points of contact (5) so that fingers can find purchase when the user wishes to remove the scratching post from the receiving object.

FIG. 2 is a perspective view of the front or closed side of the scratching post, showing the scratching surface material (3) attached to the main superstructure (2). Along the vertical side edges (7) of the main superstructure (2) a non-slip material (4) may be attached for added stability.

FIG. 3 is a sectional view of the scratching post (1) with the section taken at plane (8) showing the main superstructure (2), adhesive element (9) and scratching surface material (3).

FIG. 4 is a perspective view of the front side of the scratching post (1), showing the post clamped onto a common household doorjamb (10). The bottom portion (11) of the scratching post rests on the floor (12) and requires no base for stability.

Figure 5:
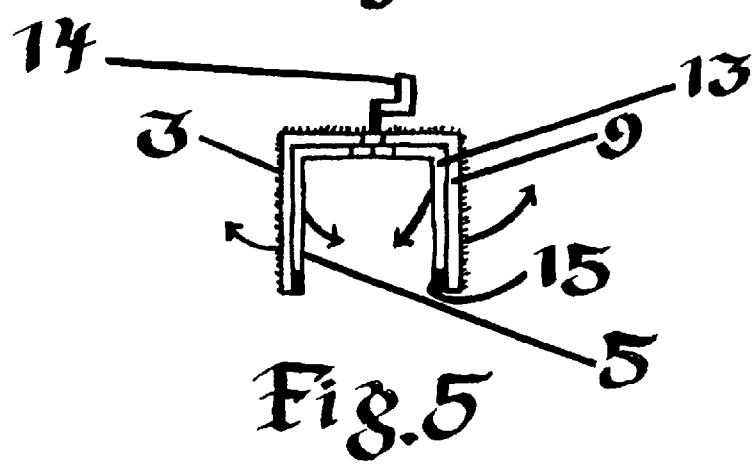
FIG. 5 is a sectional view of the scratching post, showing a mechanical clamping device incorporated within the main superstructure.

FIG. 5 is a sectional view of the scratching post (1) with the section taken at plane (8) showing the main superstructure (2) as generally "L" shaped, which can accomodate the incorporation of a mechanical clamping device (13) such as a C-clamp, toggle clamp, or modified open ended "worm-drive" clamp. Said clamping device could incorporate a device for adjustment such as a hex key wrench or breakaway crank arm (14). An adhesive element (9) is implemented for attachment of the scratching surface material (3). Rubberized edges (15) at the points of contact (5) between the clamping device (13) and the receiving object are also shown.

Figure 6:
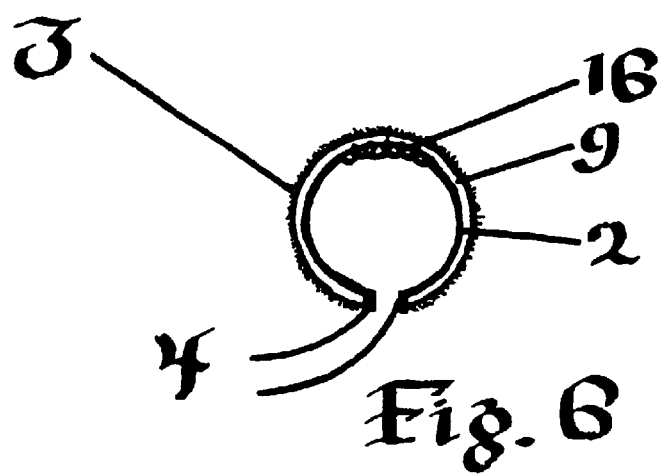
FIG. 6 is a sectional view of the scratching post, showing a springed hinge device incorporated into the main superstructure.

FIG. 6 is a sectional view of the scratching post (1) with the section taken at plane (8), showing a springed hinge (16) incorporated along the front side of the post (1).

Figure 7:
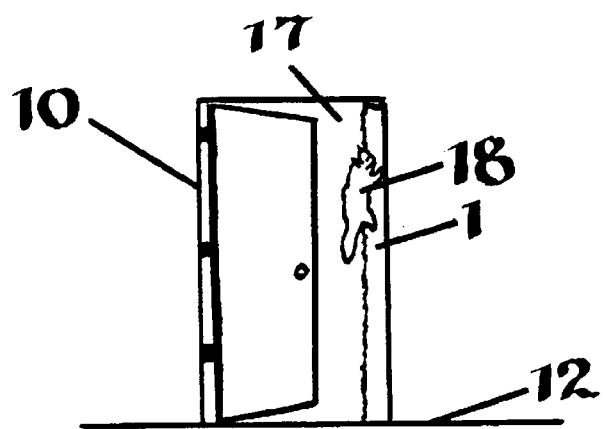
FIG. 7 is a perspective view of a household doorway with the scratching post mounted onto one side of the doorjamb.

FIG. 7 is a perspective view of a household doorway (17) with the scratching post (1) mounted onto one side of the doorjamb (10). A cat (18) is shown climbing on the scratching post.

Figure 8:
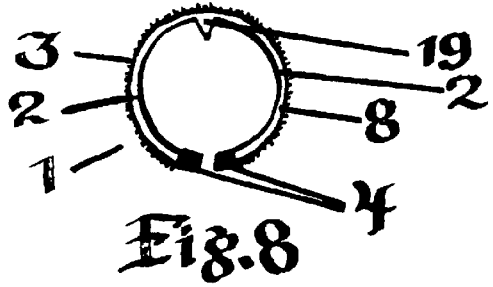
FIG. 8 is a sectional view of the scratching post, showing the incorporation of a creased superstructure surface for greater flexibility and resilience.

FIG. 8 is a sectional view of the scratching post (1) with the section taken at plane (8), showing the incorporation of a crease, perforation, or notch (19) in the main superstructure (2) for greater flexibility and resilience.

Figure 9:
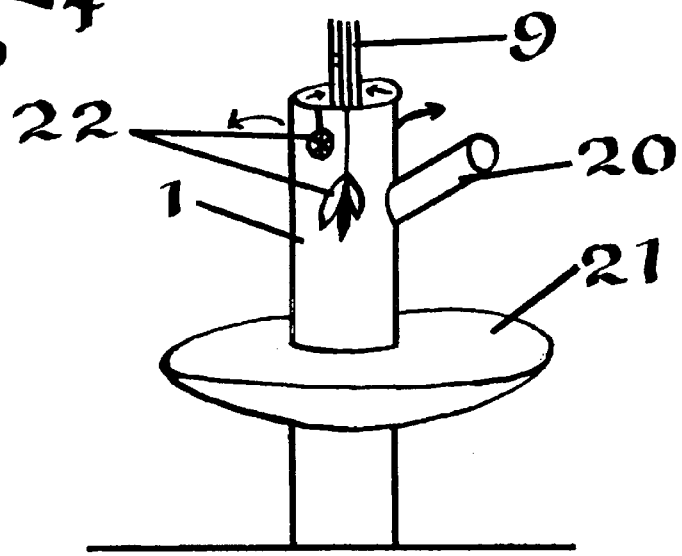
FIG. 9 is a perspective view showing how various types of perches and toys can be attached to the scratching post to provide additional attractions for cats.

FIG. 9 shows a perch (20), ledge (21), and clip-on toys (22) that can be attached to the scratching post (1) to provide additional attractions for cats. These items could be attached at various points on the scratching post (1) and could radiate or extend in any direction or angle from the scratching post (1).

Figure 10:
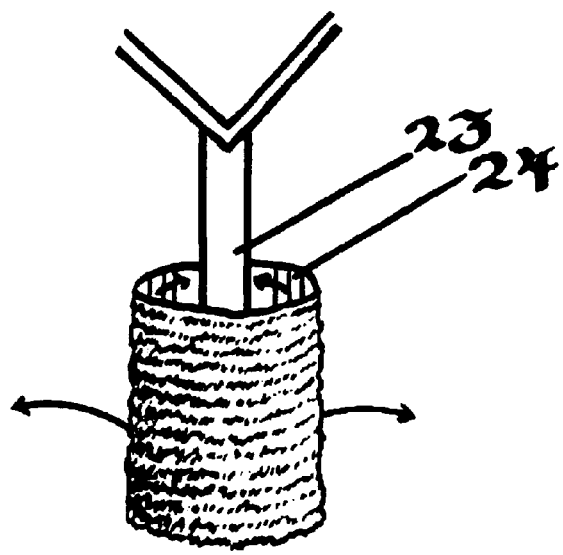
FIG. 10 shows the invention removably attached to a table leg.

In FIG. 10 the invention is shown clamped to a table leg (23) at its concave surface (24). Since a typical table leg is of a different diameter than is a typical doorjamb, different production models of the invention can be produced that are themselves of a more appropriate diameter to be used with each of these different receiving objects. This would be especially important in the case of an embodiment which is attaching to the receiving object by the spring resiliency of the superstructure itself.

Figure 11:
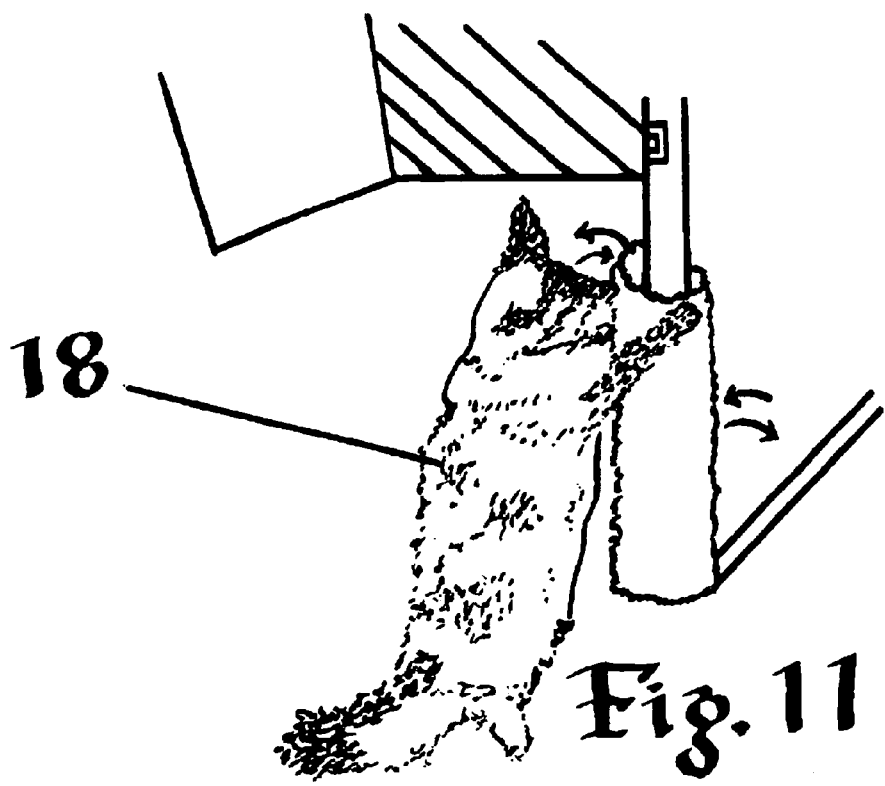
FIG. 11 shows the invention in use by a domestic cat.

In FIG. 11 the invention is shown being used by a cat (18) for the purpose of typical clawing or stretching behavior.

Figure 12:
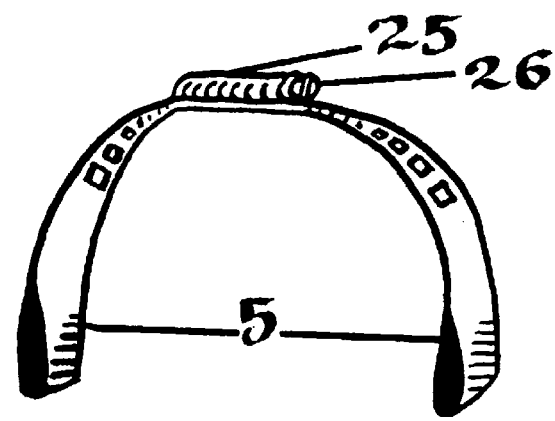
FIG. 12 shows a modified worm drive clamp that can attach the invention to a receiving object.

In FIG. 12 a modified worm drive clamp is seen by which the invention can be attached to a receiving object. The contact points (5) provided to attach the clamp to the receiving object. A worm drive (25) is provided by which the distance can be decreased between the contact points (5) for the purpose of urging the scratching post against the receiving object. The worm drive has a screw head (26) or other method of tightening such as a hex key or breakaway crank arm, any of which can be turned in order to cause the worm drive progressively to decrease the distance between the contact points (5).

Figure 13:
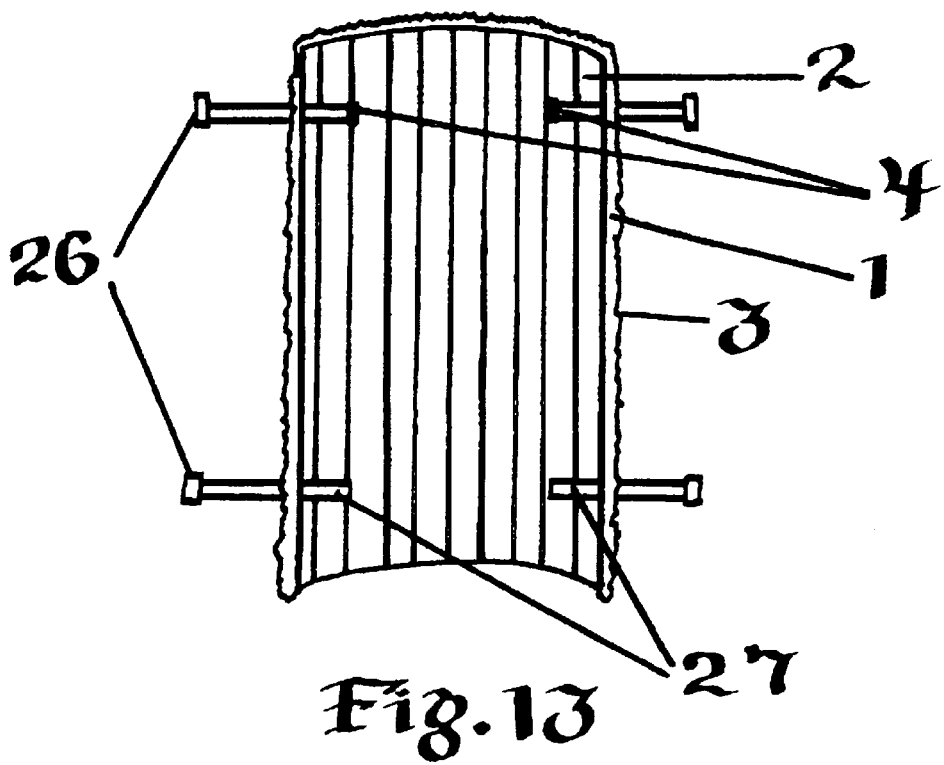
FIG. 13 is a perspective view showing the stabilizing screws.

Referring now to FIG. 13, The stabilizing screws (27) are shown by which the invention can be attached to a receiving object. Non-slip material (4) can be placed on the contact points of the stabilizing screws (or alternatively on the contact points of the other clamp types). The stabilizing screws (27) have screw heads (26) or other methods of tightening which can be turned to urge the scratching post (1) to hug the receiving object more forcefully.

In operation one attaches the cat scratching post to a receiving object by clamping the post onto said object. Mounting can be accomplished by various means. In the preferred practical application of the device, the scratching post is comprised of a resilient yet rigid main superstructure, which can be pried open and clamped onto a receiving object such as a household doorjamb. The scratching post can simply rest on the floor for support while the resilient nature of the superstructure provides the clamping force necessary to keep the post secured to the doorjamb. By using an adjustable mechanical clamping device the user can attach the scratching post to a variety of receiving objects without relying on the floor for support. Since the device can support itself against the floor, it follows that two units of the size depicted in FIG. 4 can be placed one above the other on a receiving object to produce the full length effect seen in FIG. 7. The upper unit would support itself on the lower. Depending on the clamping means used in an individual embodiment, the two units might be independently clamped to the receiving object, or jointly clamped. The same clamp might also be the means of attachment for perch and toy elements. The cat scratching device can be made in varying lengths.

When the scratching post is attached, the following design elements(among others) can be used to hold the device in place:

I. When pried open, the resilient nature of the superstructure creates a clamping force sufficient to clamp the scratching post securely onto or around a receiving object;

II. A mechanical clamping device such as a c-clamp, spring hinge, toggle clamp, stabilizing screws, or modified open ended "worm-drive" clamp can be incorporated to attach the scratching post securely to a receiving object.

III. Non-slip material can be incorporated to provide added traction at the points of connection between the scratching post (or clamp) and the receiving object.

When the user wishes to remove the scratching post from the receiving object, either the resilient superstructure is pried open and removed or the clamping mechanism is simply released. The streamlined design provides for convenient storage when not in use.

What is claimed is:

1. In combination:
a flexible sturdy superstructure having a long axis, a first side, a second side, at least two folds paralleling said long axis, and connection means; a covering connected to said first side by said connection means, said covering being susceptible to engagement by animal claws; said folds all causing said first side to be salient; said flexible sturdy superstructure superstructure being deformable to embrace a receiving object against said second side.

2. The combination of claim 1 in which said folds are infinite in number so that said superstructure is cylindroid, said first side is convex, and said second side is concave.

3. The combination of claim 1 in which said connection means is VELCRO (hook and loop fasteners).

4. The combination of claim 1 in which said connection means is glue.

5. The combination of claim 1 in which said connection means is snaps.

6. The combination of claim 1 in which said connection means is buttons.

7. The combination of claim 1 in which said superstructure has contact points meeting said receiving object, said contact points being slip resistant.

8. The combination of claim 1 in which said superstructure has contact points meeting said receiving object and said contact points have apertures suitably sized to admit human fingers between said superstructure and said receiving object.

9. The combination of claim 1 in which said superstructure has stabilizing screws; said stabilizing screws engaging said receiving object; said stabilizing screws being adjustable to a plurality of engagement force levels.

10. The combination of claim 1 further comprising a projection from said first side, said projection being suitably sized to provide a resting point for an animal.

11. The combination of claim 1 further comprising said superstructure has fastening means; and animal toys adapted to be fastened to said fastening means are removably fastened to said fastening means.

12. The combination of claim 1 further comprising a removable base adapted to be attached to said superstructure by an attachment means.

13. The combination of claim 1 further comprising a removable ledge adapted to be attached to said superstructure by an attachment means.

14. In combination:
a first resilient sturdy superstructure having a first long axis, a first side, a second side, first folds paralleling said first long axis, first connection means and first attachment means; a first covering connected to said first side by said first connection means, said first covering being susceptible to engagement by animal claws; said first folds all causing said first side to be salient; said first attachment means operable to attach said first resilient sturdy superstructure to a receiving object;

a second resilient sturdy superstructure having a second superstructure long axis, an outside, an inside, second superstructure folds paralleling said second superstructure long axis, and second superstructure connection means; a second superstructure covering connected to said outside by said second superstructure connection means, said second superstructure covering being susceptible to engagement by animal claws; said second superstructure folds all causing said outside to be salient; and said first attachment means being operable to attach said first resilient sturdy superstructure to said second resilient sturdy superstructure.

* * * * *